May 24, 1927.  E. N. TURNER  1,629,814
ROPE TIRED WHEEL
Filed April 30, 1926
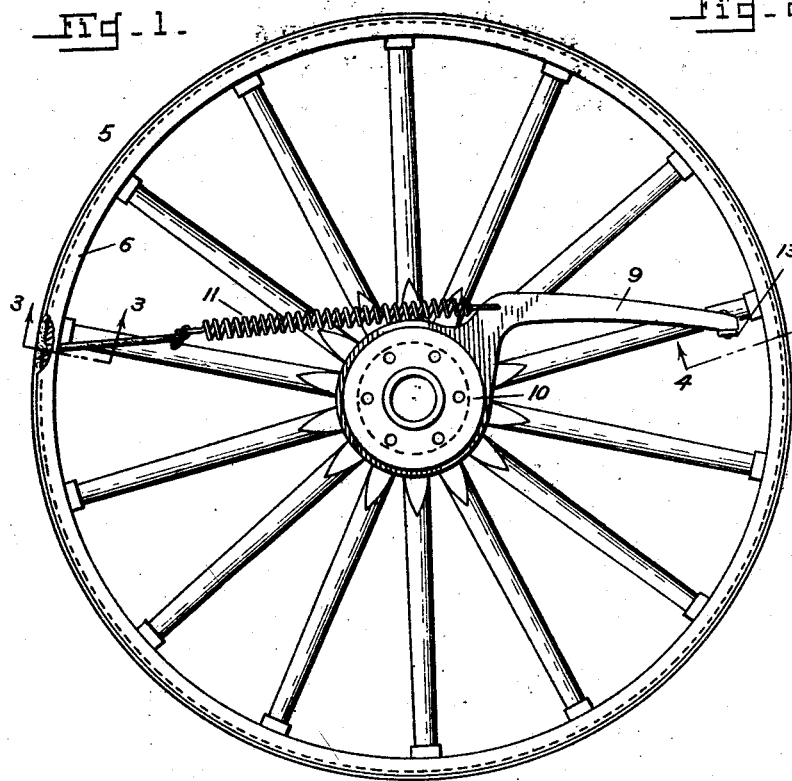
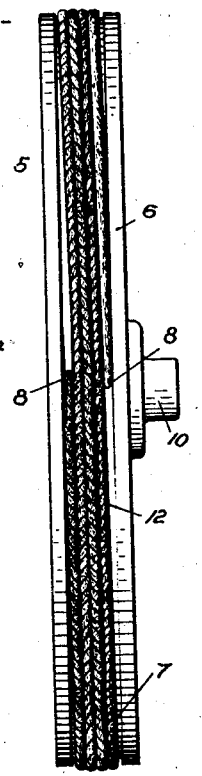
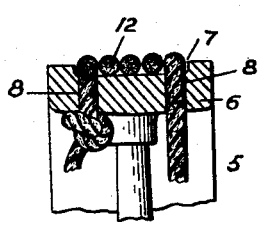
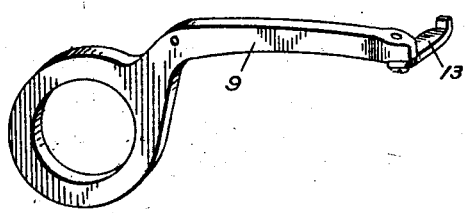
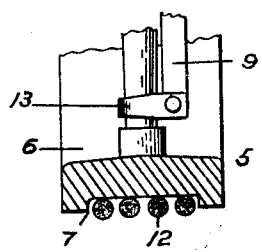
Inventor
E. N. Turner
By W. N. Roach
Attorney Patented May 24, 1927.

UNITED STATES PATENT OFFICE.

ELIJAH N. TURNER, OF THE UNITED STATES ARMY, FORT WINT, PHILIPPINE ISLANDS.

ROPE-TIRED WHEEL.

Application filed April 30, 1926. Serial No. 105,882.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

This invention relates to a rope tired wheel and to a method of installing the tire thereon.

The general method of installing rope tires on wheels consists in drawing a section of rope as tightly as possible about the felly and joining the ends by splicing. This is not only a difficult task requiring considerable time but one which is very hard on the hands of the operator. Furthermore, unless the tire is secured very tightly it slips and when loosened by stretching due to wear it is cut on the side rim of the wheel thus necessitating replacement or repair by splicing in a new section.

The principal object of this invention is to overcome the difficulties encountered in installing a rope tire and to provide means on a wheel for securing one end of a tire and for taking up slack.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a view in side elevation of a wheel constructed in accordance with the invention;

Fig. 2 is an edge view thereof;

Fig. 3 is a sectional view on the line 3—3 of Fig. 1;

Fig. 4 is a sectional view on the line 4—4 of Fig. 1;

Fig. 5 is a detail view of the lever; and

Fig. 6 is a detail view of the lever catch.

Referring to the drawings by numerals of reference:

In carrying out the invention there is provided a wheel 5 whose felly 6 is formed with a peripheral groove 7 in which is to be placed a rope tire. At any point in its circumference the felly is provided with a pair of holes 8—8 located adjacent the sides of the groove and of a size to receive the rope to be used in tiring the wheel.

Mounted on the hub of the wheel is a lever 9 preferably bent and secured in any suitable manner specifically by the hub cap 10. Attached to the lever at its bent portion is a spring 11, the purpose of which will presently appear.

The tire 12 consists of a section of rope and is installed in the following manner:

An end of the rope is passed through one of the holes 8 from the outside and knotted. The rope is then wound about the felly in the groove 7 and the free end inserted through the other hole 8 where it is drawn taut and fastened to the spring 11. The lever is turned until the spring is under tension and is then advanced under further tension of the spring to the first available spoke of the wheel where it is locked in place by means of a catch 13 pivotally secured on the extremity of the lever. The catch may be turned in so as not to strike the spokes on operation of the lever.

It will thus be seen that the tire is kept tight about the wheel and that slack may be readily taken up by advancing the lever the required amount.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A wheel embodying a peripherally grooved felly provided with a pair of holes, a bent lever mounted on the hub of the wheel, a pivoted catch on the end of the lever adapted to engage the spokes of the wheel, a spring attached to the bent portion of the lever, a rope passed through one of the holes and knotted, said rope wound in the groove of the felly and the other end of the rope inserted through the remaining hole and secured to the spring.

2. A wheel embodying a peripherally grooved felly provided with a pair of holes, a bent lever mounted on the hub of the wheel, means for locking the lever in place, a spring attached to the bent portion of the lever, a rope passed through one of the holes and knotted, said rope wound in the groove of the felly and the other end of the rope inserted through the remaining hole and secured to the spring.

3. A wheel, a lever mounted on its hub, means for locking the lever in place, a spring secured to the lever, and a rope tire consisting of a section of rope, one end of which is secured to the wheel and the other end to the spring.

4. A wheel, a lever mounted on its hub, means for locking the lever in place, and a rope tire consisting of a section of rope, one end of which is secured to the wheel and the other end to the lever.

ELIJAH N. TURNER.